(12) United States Patent
Nuzman

(10) Patent No.: US 7,801,017 B2
(45) Date of Patent: Sep. 21, 2010

(54) COMMUNICATION SYSTEM FOR IMPROVED CROSS TALK ESTIMATION AND METHOD THEREOF

(75) Inventor: Carl J. Nuzman, Union, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 99 days.

(21) Appl. No.: 12/230,081

(22) Filed: Aug. 22, 2008

(65) Prior Publication Data

US 2010/0046355 A1    Feb. 25, 2010

(51) Int. Cl.
H04L 1/12 (2006.01)
H04J 11/00 (2006.01)
H04J 1/16 (2006.01)

(52) U.S. Cl. .................. 370/201; 370/208; 370/252

(58) Field of Classification Search .............. 370/201, 370/208, 252
See application file for complete search history.

(56) References Cited

U.S. PATENT DOCUMENTS

| | | | | |
|---|---|---|---|---|
| 2001/0004383 A1* | 6/2001 | Nordstrom et al. | ......... | 375/222 |
| 2003/0099286 A1* | 5/2003 | Graziano et al. | ........... | 375/222 |
| 2004/0028154 A1* | 2/2004 | Yellin et al. | ............... | 375/341 |
| 2005/0175078 A1* | 8/2005 | Redfern | ................. | 375/222 |
| 2006/0095220 A1* | 5/2006 | Vrba et al. | .................. | 702/104 |
| 2006/0268740 A1* | 11/2006 | Rosenberg et al. | ......... | 370/254 |
| 2008/0285740 A1* | 11/2008 | Schelstraete et al. | ... | 379/406.06 |
| 2009/0059780 A1* | 3/2009 | De Lind Van Wijngaarden et al. | ......... | 370/201 |
| 2009/0092036 A1* | 4/2009 | Peeters et al. | ............ | 370/201 |
| 2009/0175156 A1* | 7/2009 | Xu | ............. | 370/201 |
| 2009/0207985 A1* | 8/2009 | Cioffi et al. | ............ | 379/93.01 |
| 2009/0271550 A1* | 10/2009 | Clausen et al. | ............ | 710/269 |
| 2009/0310502 A1* | 12/2009 | Nuzman et al. | ............ | 370/252 |

* cited by examiner

*Primary Examiner*—Andrew Lee
(74) *Attorney, Agent, or Firm*—Harness, Dickey & Pierce

(57) ABSTRACT

The present invention relates to a communication system for improved crosstalk estimation and method thereof. The communication system may include a vectoring group and a central office. The vectoring group includes a plurality of first communication lines and at least one second communication line. The plurality of first communication lines is a different type of communication line from the at least one second communication line. The central office is configured to assign the pilot sequences to each communication line within the plurality of first communication lines according to a first constraint. The central office is also configured to delay sending a sync flag in response to a request until a flag sequence of the at least one second communication line satisfies a second constraint. The assigned pilot sequences and sent flag sequences are orthogonal to each other based on the first and second constraints.

30 Claims, 3 Drawing Sheets

COMMUNICATION SYSTEM FOR IMPROVED CROSS TALK ESTIMATION AND METHOD THEREOF

BACKGROUND

Currently, in communication systems, signals sent on legacy Very High Speed Digital Subscriber Line 1 ("VDSL2") lines interfere with crosstalk estimation being performed by communication lines adhering to the emerging G.vector amendment of VDSL2. For example, within the emerging G.vector amendment to the VDSL2 standard, crosstalk coefficients between communication lines will be estimated using pilot signals sent during sync symbol periods.

In the legacy VDSL2 standard, sync symbols occur periodically after every 256 data symbols. On a particular legacy communication line, all tones transmit one of two complex points of a 4-QAM constellation during the sync symbol period. For example, the two complex points may be 00 corresponding to "1+j" or 11 corresponding to "−1−j". For explanatory purposes only, the two complex points will be represented by "1" and "−1." Normally, the value transmitted during the sync symbol period is the same from sync symbol to sync symbol. For example, a central office may transmit downstream the value "1" repeatedly on all active tones. When the central office receives an online reconfiguration request (OLR) from a customer-side equipment, the central office may then switch the value to "−1" and send "−1" repeatedly to the customer-side equipment. Such a transition is interpreted by the customer-side equipment as an acknowledgment of the OLR. Such an acknowledgment is referred to hereinafter as a sync-flag. A sequence of "1" values and "−1" values that is used to convey sync-flags (or the absence of a sync flag) will be referred to hereinafter as a flag sequence.

In the emerging G.vector amendment to the VDSL2 standard, the current consensus is that pilot signals will be sent on sync symbols. For example, mutual orthogonal pilot sequences may be sent instead of flag sequences downstream on sync symbols during the sync symbol periods to estimate crosstalk on communication lines. For instance, a pilot sequence may be assigned to each communication line and the pilot sequence may be sent downstream to the customer-side equipment. At the customer-side equipment, error samples are determined and fed back to the central office. At the central office, the error samples are correlated with the pilot sequences in order to obtain estimates for all of the crosstalk coefficients. The process of obtaining error samples may be repeated as needed to obtain a more accurate crosstalk estimate. These estimates will then be used to cancel crosstalk using precoding. Each symbol of the pilot sequence may be similar in nature to the legacy sync symbol. For instance, each symbol of the pilot sequence may also include the values "1" or "−1."

When legacy VDSL2 communication lines (hereinafter "legacy communication lines") and communication lines adhering to the G.vector amendment (hereinafter "G.vector communication lines") are both present in a communication system, the flag sequences on the legacy communication lines may interfere with the crosstalk estimation being performed by the G.vector communication lines. For example, if a communication system has four G.vector communication lines, the pilot sequences may be (1,1,1,1), (1,1,−1,−1),(1,−1,1,−1) and (1,−1,−1, 1). Each pilot sequence is assigned to each of the 4 G.vector communication lines, respectively, and transmitted repeatedly on the sync symbols during the sync periods. Then to estimate the crosstalk from the second communication line into the third communication line, a sequence of four error samples measured at the customer-side equipment of the third communication line would be correlated with the pilot sequence of (1,1,−1,−1) assigned to the second communication line. Crosstalk from the other G.vector communication lines would not affect this measurement because of the orthogonality of the pilot sequences.

If the same communication system includes a legacy communication line, the central office would send the flag sequence by sending "1" repeatedly on all active tones until the central office received an OLR from the customer-side equipment, at which point the central office would acknowledge receipt of the OLR by sending a sync-flag by starting to send "−1" repeatedly on all active tones. If the flag sequence sent on the legacy communication line happened to be (1,1,−1,−1), coinciding with the pilot sequence sent on the second G.vector communication line, then the crosstalk estimate from the second G.vector communication line into the third G.vector communication line would be corrupted by crosstalk from the legacy communication line. As a result, the flag sequence on the legacy line could appear random, or could have consistent deterministic patterns, and thus controlling or predicting the level of contamination may be difficult.

The best existing solution is to shift the timing of the sync symbols of the legacy communication lines relative to the sync symbols of the G.vector communication lines. For example, the pilot sequences of the G.vector communication may be sent at one-time during a common sync period. Any legacy communication line may be shifted so that their sync symbols, containing flag sequences, occur in between common sync periods, while data symbols transmitted on the legacy communication line occur during the common sync periods. Although the sync symbols of the legacy communication lines are transmitted at a different time from the common sync period, interference with the crosstalk estimation may still occur because data symbols of the legacy communication lines will interfere with the crosstalk estimation.

For example, suppose that crosstalk estimation from a G.vector communication line i into a G.vector communication line k is estimated using a bipolar sequence of length L to modulate the sync symbols, and a legacy communication line is not present within the communication system. Focusing on a particular sub-carrier, the variance of the crosstalk coefficient estimate would be $N_k/L$, where $N_k$ is the background noise power on G.vector communication line k. However, if a (mis-aligned) legacy communication line, line n, is present, then the variance of the estimate becomes $N_k/L + |H_{kn}|^2 P_n/L$, where $H_{kn}$ is the relative crosstalk coefficient from the legacy communication line n into G.vector communication line k, and $P_n$ is the transmitted power on the legacy communication line n. The additional variance in the crosstalk estimate indicates that crosstalk cancellation will be less accurate, or that it will take longer to achieve the same level of crosstalk cancellation. Furthermore, the additional variance term proportional to the power of the crosstalk from the legacy communication line into the G.vector communication line may be relatively significant.

SUMMARY

The present invention relates to a communication system for improved crosstalk estimation and method thereof.

According to an example embodiment, the communication system includes a vectoring group and a central office. The vectoring group includes a plurality of first communication lines and at least one second communication line. The plurality of first communication lines is a different type of communication line from the at least one second communication line. The central office is configured to assign the pilot sequences to each communication line within the plurality of first communication lines according to a first constraint. The central office is also configured to delay sending a sync flag in response to a request until a flag sequence of the at least one second communication line satisfies a second constraint. The assigned pilot sequences and sent flag sequences are orthogonal to each other based on the first and second constraints.

The request may be an online reconfiguration request received from the at least one second communication line. Furthermore, the assigned pilot sequences may be orthogonal to each other.

According to example embodiments, the central office is configured to estimate crosstalk into a communication line j of the plurality of first communication lines without interference from the at least one second communication line. The element j may be 1 of 1 to M, where M is a total number of the plurality of first communication lines. A variance of the crosstalk estimate into the communication line j is $N_j/L$, $N_j$ representing background noise power on the communication line j, and L is a length of a bipolar pilot sequence.

The first constraint is that a first pilot value of the pilot sequence is opposite to a preceding second pilot value of the pilot sequence. The second constraint is that a first flag value of the flag sequence is equal to a preceding second flag value of the flag sequence.

The central office is configured to transmit the pilot sequences according to the first constraint along the plurality of first communication lines during a common sync period.

According to another example embodiment, the sync flag may be further delayed to occur after a flag value of the flag sequence. A time index of the flag value being a multiple of K, where K is an integer greater or equal to 1. The central office is configured to transmit the flag sequence along the at least one second communication line. Each value of the flag sequence includes one of two values. The sync flag is a transition from one flag value to another.

According to another example embodiment, the method includes assigning pilot sequences according to a first constraint to a plurality of first communication lines, where each assigned pilot sequence corresponds to a communication line within the plurality of first communication lines. The method further includes delaying a sync flag in response to a request until a flag sequence of at least one second communication line satisfies a second constraint. The plurality of first communication lines is a different type of communication line from the at least one second communication line. The assigned pilot sequences and the flag sequences are orthogonal to each other based on the first and second constraints.

According to another example embodiment, a method includes sending a request along at least one second communication line. The at least one second communication line is a different type of communication line from a plurality of first communication lines. The plurality of first communication lines is assigned pilot sequences according to a first constraint. The method further includes receiving a sync flag when a flag sequence of the least one second communication line satisfies a second constraint. The assigned pilot sequences and the flag sequence are orthogonal to each other based on the first and second constraints.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
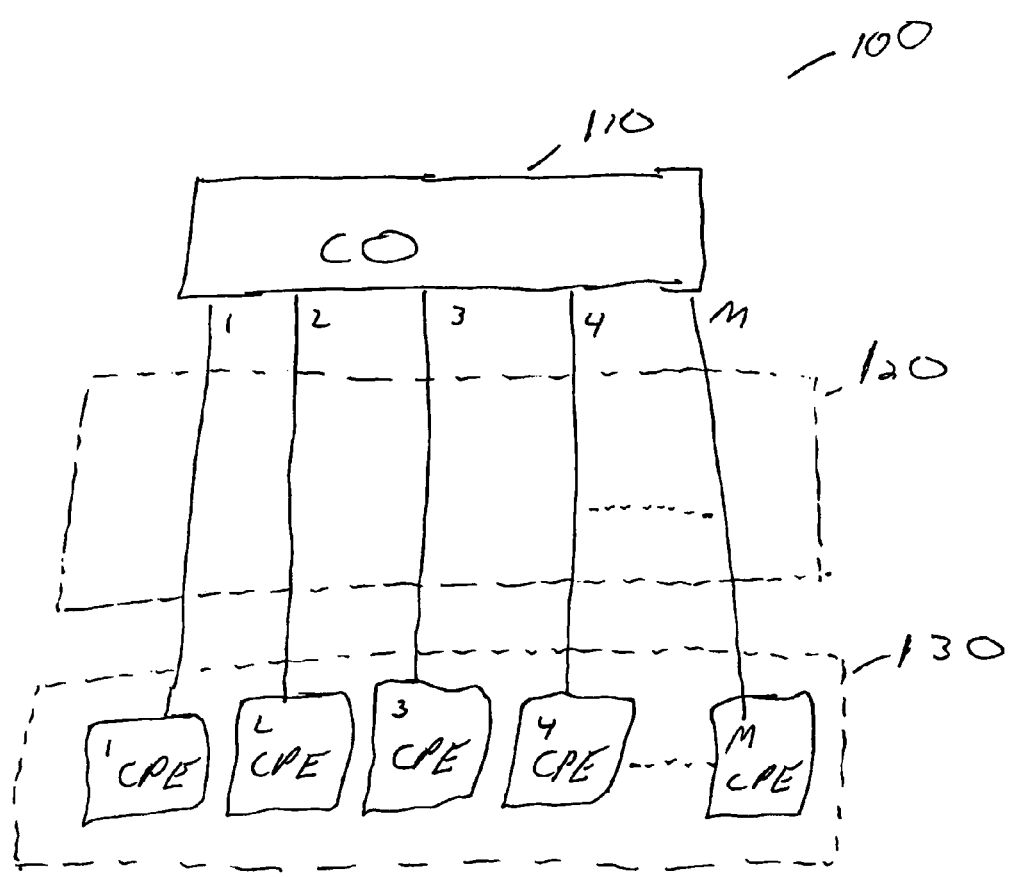
FIG. 1 illustrates a communication system for estimating crosstalk coefficients according to example embodiments.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 illustrates a communication system 100 for estimating crosstalk coefficients according to example embodiments. The communication system 100 includes a central office (CO) 110, a vectoring group 120, and a plurality of M customer-side equipments (CPE) 130.

The CO 110 may include a plurality of operator-side modems, each connected to one of the M communication lines, and a vectoring control entity (VCE) which coordinates the transmissions on the communication lines. For example, the vectoring control entity may be configured to coordinate the signals sent on the communication lines by precoding, and to estimate the coefficients of the crosstalk channels between communication lines. The operator-side modems may be configured to adhere to the G.vector amendment to the VDSL2 standard, or to operate according to principles that have been proposed to the G.vector committee.

Each one of the plurality of M CPEs 130 may include a number of communication devices such as a DSL modem, a splitter, and a telephone. The DSL modem may adhere to the current VDSL2 standard. Such a modem is referred to hereinafter as a legacy modem. Alternatively, the modem may adhere to the G.vector amendment of the VDSL2 standard, or, it may adhere to principles that have been proposed to the G.vector committee, such as: measuring error samples relative to sync symbols, and returning error samples to the CO via an upstream feedback channel. Such a modem is referred to hereinafter as a G.vector modem. M is an integer indicating the number of CPEs present on the communication system 100. There may also be other communication lines coming from the CO 110 that are not controlled by the VCE, are not part of the vectoring group 120, and are not depicted in FIG. 1.

The vectoring group 120 includes a plurality of M communication lines. Each one of the plurality of M communication lines may correspond and be connected to one of the plurality of M CPEs 130. The plurality of M communication lines may include a plurality of first communication lines, and at least one second communication line. The plurality of first communication lines and the at least one second communication line may be different from each other. For example, if one of the plurality of M CPEs 130 includes a G.vector modem, the corresponding communication line is referred to as a G.vector communication line. If one of the plurality of M CPEs 130 includes a legacy modem, the corresponding communication line is referred to as a legacy communication line.

The CO 110 is configured to transmit sync symbols along the plurality of M communication lines during a sync period. Each one of the plurality of M communication lines may transmit one of two complex points of a 4-QAM constellation during the sync symbol period. For example, the two complex points may be 00 corresponding to "1+j" or 11 corresponding to "−1−j." For explanatory purposes only, the two complex points will be represented by "1" and "−1."

On the plurality of first communication lines, the CO 110 is configured to transmit pilot sequences on the sync symbols. The pilot sequence is a sequence of values; for example, the values may include either "1" or "−1". The length of the pilot sequence is L, where L is an integer greater than or equal to 1. The pilot sequences are used to estimate crosstalk coefficients among the plurality of first communication lines. For instance, to estimate crosstalk coefficients, the CO 110 transmits pilot sequences to the CPE 130 along the first communication lines. At the CPE 130, error samples consisting of interference and noise are determined based on the transmitted pilot sequences. Thereafter, the CPE 130 transmits the error samples to the CO 110 to be correlated with the pilot sequences in order to obtain estimates for all of the crosstalk coefficients. This process can be repeated as needed to obtain more and more accurate crosstalk estimates.

On the at least one second communication, the CO 110 is configured to transmit a flag sequence during a sync symbol period. The flag sequence is also a sequence of values; for example, the values may include either "1" or "−1". The length of the flag sequence is L, where L is an integer greater than 1. For example, the CO 110 transmits either "1" or "−1" repeatedly until an online reconfiguration request ("OLR") is received at the CO 110 from the CPE 130. For instance, the CO 110 may transmit "1" repeatedly on all tones during a sync symbol period. When the CO 110 receives an OLR from the CPE 130, the CO 110 may then transmit "−1" repeatedly until a next OLR.

Figure 2:
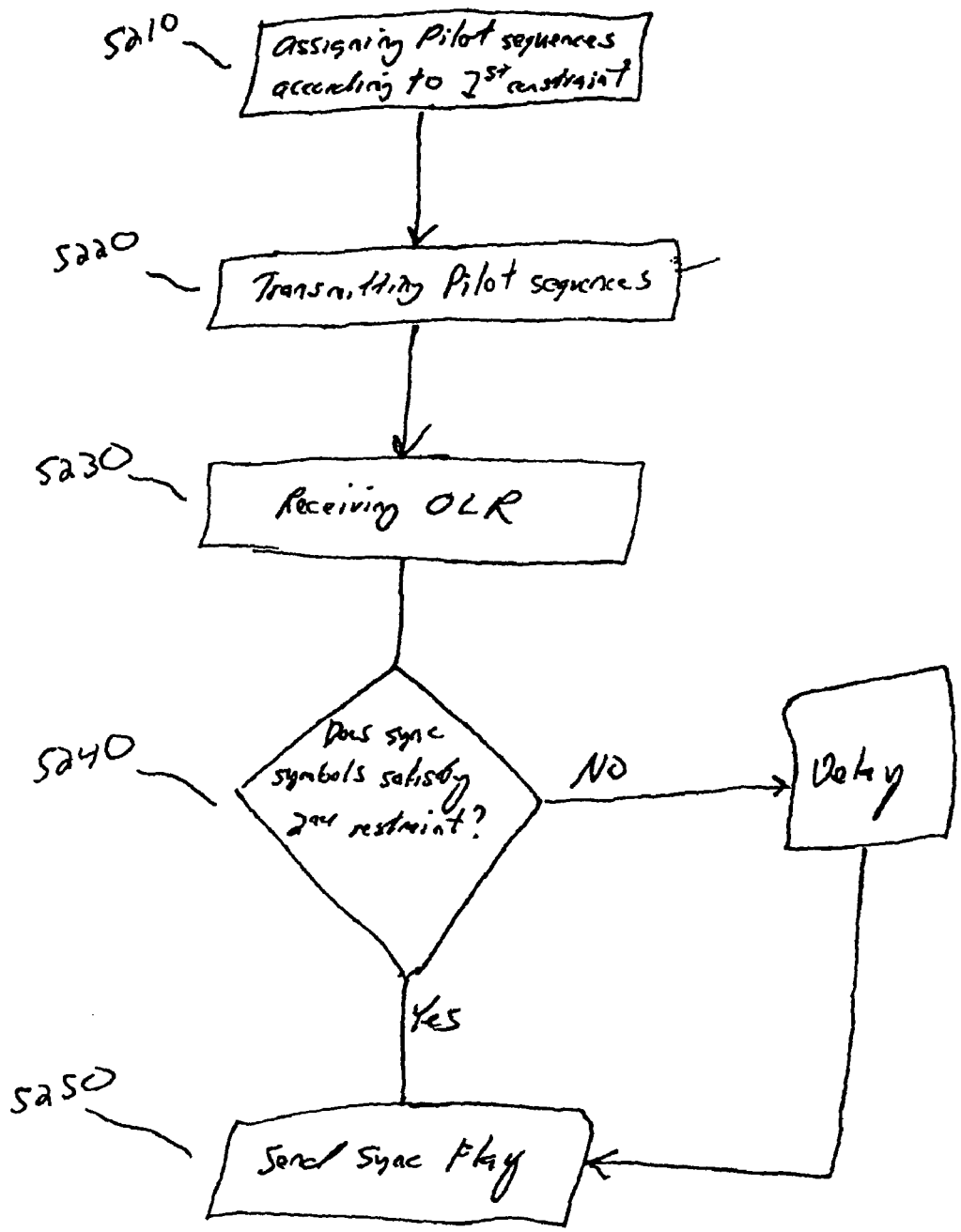
FIG. 2 illustrates a flow chart diagram for estimating crosstalk according to example embodiments.

FIG. 2 illustrates a flow chart diagram for estimating crosstalk according to example embodiments. The details and operation of the communication system 100 of FIG. 1 will be explained with reference to FIGS. 1 and 2.

In S210, the CO 110 assigns pilot sequences to the plurality of first communication lines according to a first constraint. The pilot sequence has a length L including a plurality of pilot values. The first constraint is that an even-numbered pilot value of the pilot sequence is opposite to a preceding odd-numbered pilot value of the pilot sequence. For example, a pilot sequence (1,−1,1,−1) may be assigned to one of the first communication lines. In this particular example, L=4 and the even-numbered pilot values are "−1" and "−1". The preceding odd-numbered pilot values for each even-numbered pilot value are 1 and 1. Although odd-numbered and even-numbered pilot values are used in this example embodiment, example embodiments of the present invention are not limited thereto, where the reverse situation is within example embodiments.

The first constraint ensures that the pilot sequences are orthogonal to flag sequences adhering to a second constraint, that will be described below. Advantageously, the pilot sequences may also be designed to be mutually orthogonal to each other. It is noted that the assigned pilot sequences, number of pilot values, and number of communication lines are for explanatory purposes only, where other pilot sequences, number of pilot values, and number of communication lines may be different.

In another example embodiment, to create assigned pilot sequences according to the first constraint for each of the first communication lines, a pilot sequence may be formed from the Kronecker product of an unconstrained sequence of length L with the sequence (1,−1). In an example embodiment, if L=4, the Kronecker product of each of four Walsh-Hadamard sequences of length 4 with the sequence (−1,1) may be formed to obtain the following four sequences of length 8:

$$[1, -1, 1, -1, 1, -1, 1, -1]$$

$$[1, -1, 1, -1, -1, 1, -1, 1]$$

$$[1, -1, -1, 1, 1, -1, -1, 1]$$

$$[1, -1, -1, 1, -1, 1, 1, -1]$$

In S220, the CO 110 repeatedly transmits the assigned pilot sequences according to the first constraint on the first communication lines to estimate crosstalk among the plurality of first communication lines.

In S230, the CO 110 receives an OLR from the CPE 130 along the at least one second communication line. In order to ensure that the at least one second communication line does not interfere with the crosstalk estimating, the CO 110 is configured to delay sending the sync flag until a second constraint is satisfied. For instance, in S240, the CO 110 is configured to determine whether the flag sequence satisfies a second constraint on the at least one second communication line in response to the OLR from the CPE 130. If NO, then the CO 110 is configured to delay sending the sync flag until the flag sequence of the at least one second communication line satisfies the second constraint. If YES, then the CO 110 sends the sync flag (S250).

The second constraint is that an even-numbered flag value is equal to a preceding odd-numbered flag value. For instance, a flag sequence on the at least one second communication line may be [1, 1, −1, −1, 1, 1, 1, 1]. In this particular example, the transition from the second flag value "1" to the third flag value "−1" would indicate a sync flag. The CO 110 would delay sending the sync flag until the even-numbered flag value is equal to the preceding odd-numbered flag value. In this case, the CO 110 would delay sending the sync flag until the fourth sync symbol "−1." Although odd-numbered and even-numbered flag values are used in this example embodiment, example embodiments of the present invention are not limited thereto, where the reverse situation is within example embodiments.

According to example embodiments, regardless of the exact flag sequence that results, the flag sequence of the at least one second communication line according to the second constraint is orthogonal to each of the pilot sequences of the plurality of first communication lines.

The communication system 100 according to example embodiments is compatible with the legacy standard because the standard does not specify exactly how quickly a CO 110 should respond to an OLR—there is simply a time frame of approximately 400 ms. When the CO 110 is ready to respond to an OLR, the CO 110 may delay the sync flag if necessary until the next even-to-odd transition time. The next even-odd transition time may incur an extra delay of no more than approximately 64 ms, out of the entire end-to-end time budget of 400 ms.

Figure 3:
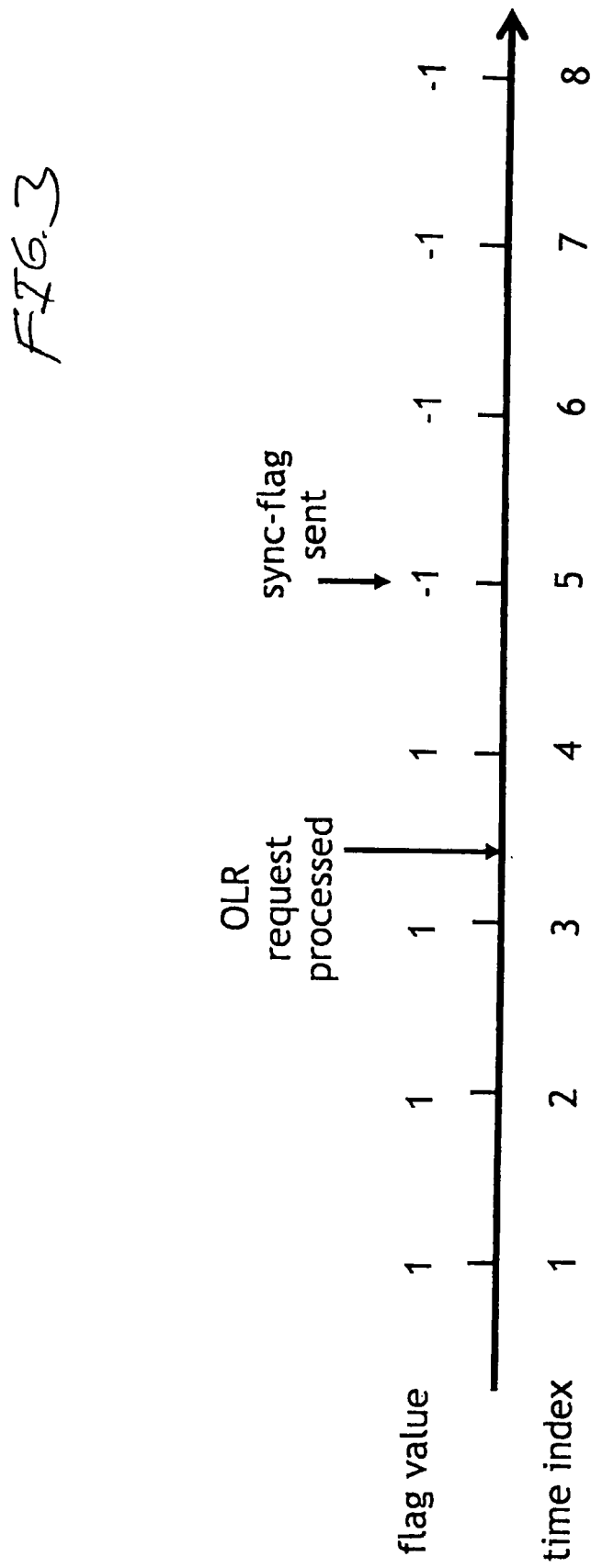
FIG. 3 illustrates timing diagrams showing the delayed sync-flag according to example embodiments.

FIG. 3 illustrates timing diagrams showing the delayed sync-flag according to example embodiments. Referring to FIG. 3, the OLR request is received at the central office along the at least one second communication line at a time between the $3^{rd}$ and $4^{th}$ time index. The time index scale is used for explanatory purposes only, where any unit measurement of time may be substituted. According to example embodiments, the sync-flag is delayed being sent until the $5^{th}$ time index. In contrast, if the sync-flag were sent at the $4^{th}$ time index, then the flag value at the $4^{th}$ time index would not be equal to the flag value at the $3^{rd}$ time index, violating the second constraint. To avoid violating this constraint, the sync-flag must be delayed until the $5^{th}$ time index.

In an alternative example embodiment, each flag value is constrained to be equal to the preceding flag value, unless the time index of the preceding flag value is a multiple of K, where K is an integer greater than two. For example, with K=3, the first, second, and third flag values must be the same, the fourth, fifth, and sixth flag values must be the same, and so on. However, the constraint of 400 ms in the VDLS2 standard may prevent K much larger than the value of 2. In the alternative example embodiment, the pilot sequences are configured to satisfy a constraint that the pilot values in each consecutive subsequence of length K should sum to zero. For example, with K=3, the first, second, and pilot flag value must sum to zero, the fourth, fifth, and sixth pilot value must sum to zero, and so on. When K is even, this constraint can be met using bipolar pilot values.

Furthermore, the CO 110 may be configured to transmit the pilot sequences according to the first constraint along the first communication lines during a common sync period. The common sync period is a period when the first communication lines transmit their sync symbols, containing pilot sequences, at one time.

According to example embodiments, the CO 110 is configured to estimate crosstalk among the plurality of first communication lines without interference from the at least one second communication line because of the pilot sequences satisfying the first constraint and the flag sequences satisfying the second constraint are orthogonal to each other. For example, the CO 110 is configured to estimate the crosstalk onto a communication line j of the first communication lines. The crosstalk estimate into communication line j is $N_j/L$, $N_j$ representing background noise power on the communication line j, and L being a length of a bipolar pilot sequence. The crosstalk estimation does not include the additional variance as described in the background section of the present application. In contrast, the crosstalk estimate is only proportional to the background noise, $N_j$.

For example, a typical background noise floor might be −40 dB relative to a useful signal. A moderate level of crosstalk that a legacy line would cause interference is at −30 dB relative to the signal level. In this case, the variance of the crosstalk coefficient estimate would be 10 dB higher under the best existing solution than according to example embodiments. As a result, the crosstalk estimation according to example embodiments is performed within a shorter period of time and is more accurate.

Example embodiments being thus described, it will be obvious that the same may be varied in many ways. Such variations are not to be regarded as a departure from the invention, and all such modifications are intended to be included within the scope of the invention.

I claim:

1. A communication system for estimating crosstalk coefficients, the communication system comprising:
    a vectoring group includes a plurality of first communication lines and at least one second communication line, the plurality of first communication lines being a different type of communication line from the at least one second communication line; and
    a central office configured to assign the pilot sequences to each communication line within the plurality of first communication lines according to a first constraint and configured to delay sending a sync flag in response to a request until a flag sequence of the at least one second communication line satisfies a second constraint, the assigned pilot sequences and sent flag sequence being orthogonal to each other based on the first and second constraints.

2. The communication system of claim 1, wherein the request is an online reconfiguration request received from the at least one second communication line.

3. The communication system of claim 1, wherein the assigned pilot sequences are orthogonal to each other.

4. The communication system of claim 1, wherein the central office is further configured to estimate crosstalk onto a communication line j of the plurality of first communication lines without interference from the at least one second communication line, wherein j equals one of 1 to M, and M is a total number of the plurality of first communication lines.

5. The communication system of claim 4, wherein a variance of the crosstalk estimate into the communication line j is $N_j/L$, $N_j$ representing background noise power on the communication line j, and L being a length of a bipolar pilot sequence.

6. The communication system of claim 1, wherein the first constraint is that a first pilot value of the pilot sequence is opposite to a preceding second pilot value of the pilot sequence, and the second constraint is that a first value of the flag sequence is equal to a preceding second flag value of the flag sequence.

7. The communication system of claim 6, wherein the central office is configured to transmit the pilot sequences according to the first constraint along the plurality of first communication lines during a common sync period.

8. The communication system of claim 1, wherein the sync flag is further delayed to occur after a flag value of the flag sequence, a time index of the flag value being a multiple of K, K being an integer greater than two.

9. The communication system of claim 1, wherein the central office is configured to transmit the flag sequence along the at least one second communication line, wherein each value of the flag sequence includes one of two values.

10. The communication system of claim 9, wherein the sync flag is a transition from one flag value to another.

11. A method for estimating crosstalk coefficients in a communication system, the method comprising:
assigning, by a central office, pilot sequences according to a first constraint to a plurality of first communication lines, each assigned pilot sequence corresponds to a communication line within the plurality of first communication lines; and
delaying, by the central office, a sync flag in response to a request until a flag sequence of at least one second communication line satisfies a second constraint, the plurality of first communication lines being a different type of communication line from the at least one second communication line, the assigned pilot sequences and the flag sequences being orthogonal to each other based on the first and second constraints.

12. The method of claim 11, wherein the request is an online reconfiguration request received from the at least one second communication line.

13. The method of claim 11, further comprising:
estimating, by the central office, crosstalk onto a communication line j of the plurality of first communication lines without interference of the at least one second communication line, wherein j equals one of 1 to M, and M is a total number of the plurality of first communication lines.

14. The method of claim 13, wherein the variance of the crosstalk estimate into communication line j is $N_j/L$, $N_j$ representing background noise power on the communication line j, and L being a length of a bipolar pilot sequence.

15. The method of claim 11, wherein the first constraint is that a first pilot value of the pilot sequence is opposite to a preceding second pilot value of the pilot sequence, and the second constraint is that a first flag value of the flag sequence is equal to a preceding second flag value of the flag sequence.

16. The method of claim 15, the method further comprising:
transmitting, by the central office, the pilot sequences according to the first constraint along the plurality of first communication lines during a common sync period.

17. The method of claim 11, wherein the sync flag is further delayed to occur after a flag value of the flag sequence, a time index of the flag value being a multiple of K, K being an integer greater than two.

18. The method of claim 11, further comprising:
transmitting, by the central office, the flag sequence along the at least one second communication line, wherein each element of the flag sequence includes one of two values.

19. The method of claim 18, wherein the sync flag is a transition from one flag value to another.

20. The method of claim 11, wherein the assigned pilot sequences are orthogonal to each other.

21. A method for estimating crosstalk coefficients in a communication system, the method comprising:
sending, by a customer-side equipment (CPE), a request along at least one second communication line, the at least one second communication line being a different type of communication line from a plurality of first communication lines, the plurality of first communication lines being assigned pilot sequences according to a first constraint;
receiving, by the CPE, a sync flag when a flag sequence of the least one second communication line satisfies a second constraint, the assigned pilot sequences and the flag sequence being orthogonal to each other based on the first and second constraints.

22. The method of claim 21, wherein the request is an online reconfiguration request (OLR).

23. The method of claim 21, the method further comprising:
transmitting, by the CPE, error samples of a communication line j of the plurality of first communications lines to estimate crosstalk without interference of the at least one second communication line, wherein j equals one of 1 to M, and M is a total number of the plurality of first communication lines.

24. The method of claim 23, wherein a variance of the crosstalk estimate onto communication line j is $N_j/L$, $N_j$ representing background noise power on the communication line j, and L being a length of a bipolar pilot sequence.

25. The method of claim 21, wherein the first constraint is that a first pilot value of the pilot sequence is opposite to a preceding second pilot value of the pilot sequence, and the second constraint is that a first flag value of the flag sequence is equal to a preceding second flag value of the flag sequence.

26. The method of claim 25, the method further comprising:
receiving, by the CPE, the pilot sequences according to the first constraint along the plurality of first communication lines during a common sync period.

27. The method of claim 21, wherein receiving the sync flag is further delayed to occur after a flag value of the flag sequence, a time index of the flag value being a multiple of K, K being an integer greater than two.

28. The method of claim 21, wherein each element of the flag sequence includes one of two values.

29. The method of claim 28, wherein the sync flag is a transition from one value to another.

30. The method of claim 21, wherein the assigned pilot sequences are orthogonal to each other.

* * * * *